US010668437B2

(12) United States Patent
Asis

(10) Patent No.: US 10,668,437 B2
(45) Date of Patent: Jun. 2, 2020

(54) GAS FILLING SYSTEM

(71) Applicant: Lior Asis, Nahariya (IL)

(72) Inventor: Lior Asis, Nahariya (IL)

(*) Notice: Subject to any disclaimer, the term of this patent is extended or adjusted under 35 U.S.C. 154(b) by 10 days.

(21) Appl. No.: 16/068,971

(22) PCT Filed: Aug. 16, 2017

(86) PCT No.: PCT/IL2017/050905
§ 371 (c)(1),
(2) Date: Jul. 10, 2018

(87) PCT Pub. No.: WO2018/033914
PCT Pub. Date: Feb. 22, 2018

(65) Prior Publication Data
US 2019/0015797 A1    Jan. 17, 2019

(30) Foreign Application Priority Data
Aug. 16, 2016  (IL) .......................... 247308

(51) Int. Cl.
B01F 3/04       (2006.01)
A23L 2/54       (2006.01)
B01F 15/02      (2006.01)
B01F 15/00      (2006.01)
F16J 13/24      (2006.01)

(52) U.S. Cl.
CPC ............ B01F 3/04794 (2013.01); A23L 2/54 (2013.01); A23V 2002/00 (2013.01); B01F 15/00746 (2013.01); B01F 15/00779 (2013.01); B01F 15/0201 (2013.01); B01F 2003/049 (2013.01); B01F 2003/04822 (2013.01); B01F 2215/0022 (2013.01); F16J 13/24 (2013.01)

(58) Field of Classification Search
CPC ............ B01F 15/00779; B01F 3/04794; B01F 15/0779; B01F 2003/04822; B01F 15/00746; B01F 15/0201; B01F 2215/0022; B01F 2003/049; A23L 2/54; F16J 13/24; A23V 2002/00
See application file for complete search history.

(56) References Cited

U.S. PATENT DOCUMENTS 4,396,159 A * 8/1983 Podell ................... A47J 43/046
                                              241/37.5
4,481,986 A * 11/1984 Meyers ............... B01F 13/0033
                                              141/113
5,260,081 A * 11/1993 Stumphauzer ............ A23L 2/54
                                              261/DIG. 7
(Continued)

FOREIGN PATENT DOCUMENTS

DE       202005009312 U1    11/2005
WO           9825485 A2      6/1998

Primary Examiner — Stephen Hobson
(74) Attorney, Agent, or Firm — William Dippert; Laurence Greenberg; Werner Stemer

(57) ABSTRACT

A system for allowing gas to flow into a liquid, the system comprising: a container having a bottom wherein the bottom comprises a gas inlet; a lid configured to cover the container; a gas providing mechanism configured to allow flow of the gas through the gas inlet into the liquid when contained in the container, and a locking mechanism configured to ensure flow of gas into the liquid only when the container is properly covered by the lid. Additional embodiments of the system are disclosed herein.

10 Claims, 11 Drawing Sheets

(56) References Cited

U.S. PATENT DOCUMENTS

| | | | | |
|---|---|---|---|---|
| 5,353,697 A * | 10/1994 | Venturati | ............... | A47J 43/046 |
| | | | | 241/37.5 |
| 5,460,846 A * | 10/1995 | Stumphauzer | ....... | B67D 1/0418 |
| | | | | 426/477 |
| 7,562,838 B2 * | 7/2009 | Leung | ................. | A47J 43/0727 |
| | | | | 241/282.1 |
| 8,985,561 B2 * | 3/2015 | Hatherell | ............ | B01F 3/04794 |
| | | | | 261/119.1 |
| D731,223 S * | 6/2015 | Hatherell | ........................ | D7/306 |
| D738,150 S * | 9/2015 | Polaski | ........................... | D7/300 |
| 2008/0142421 A1 | 6/2008 | Windmiller | | |
| 2014/0004240 A1 | 1/2014 | Hatherell | | |
| 2017/0165619 A1* | 6/2017 | Krom | .................. | B01F 3/04794 |
| 2017/0246597 A1* | 8/2017 | McClean | .................. | A23L 2/54 |

* cited by examiner

GAS FILLING SYSTEM

CROSS-REFERENCE TO RELATED APPLICATIONS

This application is a National Phase filing under 35 U.S.C. § 371 of International Patent Application No. PCT/IL2017/050905, filed Aug. 16, 2017, which is based upon and claims the benefit of the priority date of Israeli Patent Application No. 247308, filed Aug. 16, 2016, each of which is incorporated herein by reference in its entirety.

FIELD

The present subject matter relates to systems for dissolving gases in liquids. More particularly, the present subject matter relates to carbonating water or aqueous solutions with carbon dioxide.

BACKGROUND

Soda makers are devices aimed at carbonating water, namely dissolving carbon dioxide in water. The currently available soda makers use dedicated containers, for example in the shape of a bottle, normally supplied with the soda makers. These containers are especially designed for usage with a soda maker. For carbonating water, the container is filled with water and attached to the soda maker, while immersing in the water a tip that is fluidically connected to a source of pressurized carbon dioxide. The flow of carbon dioxide from the source of carbon dioxide, through the tip into the water, may be controlled by a user, for example by a valve that may be opened and closed by the user.

One drawback of the currently available soda makers is that they allow usage only of the dedicated containers that are especially designed, in terms of size and shape, for usage with specific soda makers. As a result, carbonating water with the currently available soda maker, while using other types of containers, like disposable water bottles, is impossible and in some cases not allowed.

Another drawback of the currently available soda makers is that they are huge and cumbersome, and normally immobile because of their size and weight.

Yet another drawback of the currently available soda makers is that there are expensive.

Still another drawback of the currently available soda makers is that the make use of large carbon dioxide containers that are reusable. Upon purchase of such carbon dioxide containers a deposit is paid in order to assure return of an empty carbon dioxide container in order to get in return a full carbon dioxide container. This conduct is cumbersome.

A further drawback of the currently available soda makers is that they are suitable for carbonating water in relatively large dedicated containers, for example bottles, and are not suitable for carbonating water in a relatively small container, for example a container in a size of a standard cup.

Yet a further drawback of the currently available soda makers is that they allow carbonation of only water, while carbonating beverages, for example beverages containing sugar or other solutes, is impossible, and even not allowed by some manufacturers of soda maker, due to the of foam produced during carbonation. The foam may enter the carbonation system and for example block gas tubes and the like.

Altogether, the aforementioned drawbacks of the currently available soda makers discourage potential consumers from using them, especially potential consumers that look for a portable, light, easy-to-use, versatile soda maker that allows carbonating not only water but also beverages, for example beverages containing sugar, stored in various types of containers, like bottles in various sizes and shapes, smaller containers, for example in the size of a standard cup, and the like.

SUMMARY

Unless otherwise defined, all technical and scientific terms used herein have the same meaning as commonly understood by one of ordinary skill in the art to which this subject matter belongs. Although methods and materials similar or equivalent to those described herein can be used in the practice or testing of the present subject matter, suitable methods and materials are described below. In case of conflict, the patent specification, including definitions, will control. In addition, the materials, methods, and examples are illustrative only and not intended to be limiting.

According to one aspect of the present subject matter, there is provided a system for allowing gas to flow into a liquid, the system comprising: a container having a bottom wherein the bottom comprises a gas inlet; a lid configured to cover the container; a gas providing mechanism configured to allow flow of the gas through the gas inlet into the liquid when contained in the container, and a locking mechanism configured to ensure flow of gas into the liquid only when the container is properly covered by the lid.

According to one embodiment, the gas is carbon dioxide.

According to another embodiment, the liquid is water.

According to yet another embodiment, the liquid is a beverage.

According to still another embodiment, the container is in a size of a cup.

According to a further embodiment, the container and the lid comprise a screw thread configured to allow proper covering of the container by screwing the lid over an opening of the container.

According to yet a further embodiment, the locking mechanism comprises: a vertical shaft comprising an upper end configured to be in contact with a rim of the lid, and a lower end comprising a recess, and a horizontal shaft comprising a first end configured to be accommodated by the recess of the vertical shaft, and a second end configured to be accommodated by a recess at a bar vertically connected to a lower part of an operation button, wherein the vertical shaft is connected to an elastic member.

According to still a further embodiment, the lid further comprises an orifice configured to allow flow of excess gas from the container.

According to an additional embodiment, the lid further comprises: a first plug connected to a second plug with a connector, wherein said first plug, said second plug, and said connector are positioned in a space inside the lid, and a plug handle connected to the connector and protrudes from the top of the lid, wherein the first plug is configured to block the orifice as long as the gas pressure in the container is under a predetermined threshold level, and wherein the second plug is configured to release excess gas from the container in order to allow removal of the lid after gas is allowed to flow into the liquid contained in the container, and wherein turning of the plug handle causes turning of the first plug and the second plug about a pivot positioned at the connector and the plug handle, and wherein at default, the first plug blocks the orifice, and when the plug handle is turned, the second plug blocks the orifice.

According to yet an additional embodiment, the second plug is configured to prevent exit of foam from the container during the release of excess gas pressure.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

Figure 1:
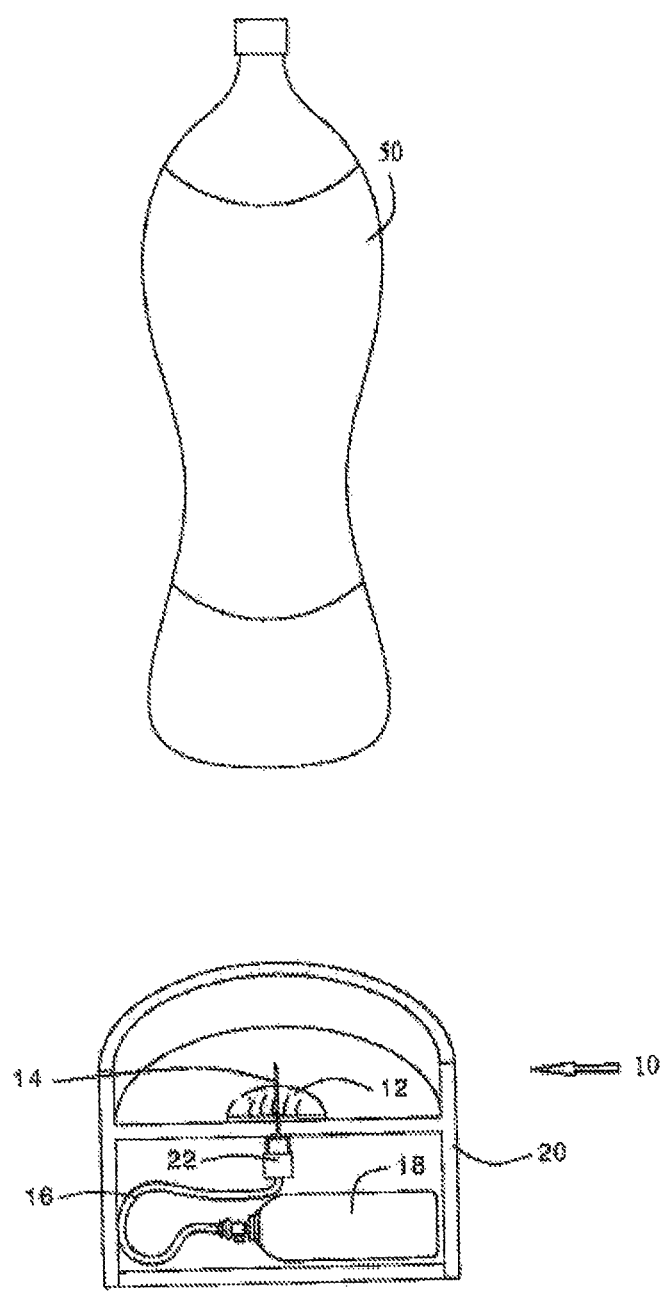
FIG. 1 schematically illustrates, according to an exemplary embodiment, a gas filling apparatus and a beverage bottle, for applying the gas filling apparatus thereto.

The drawings are not necessarily drawn to scale.

DESCRIPTION OF THE PREFERRED EMBODIMENTS

Before explaining at least one embodiment in detail, it is to be understood that the subject matter is not limited in its application to the details of construction and the arrangement of the components set forth in the following description or illustrated in the drawings. The subject matter is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

FIG. 1 schematically illustrates, according to an exemplary embodiment, a gas filling apparatus and a beverage bottle, for applying the gas filling apparatus thereto.

A gas filling apparatus 10 includes a high pressure tank 18; a pipe 16; and a piped tip 14.

Figure 2:
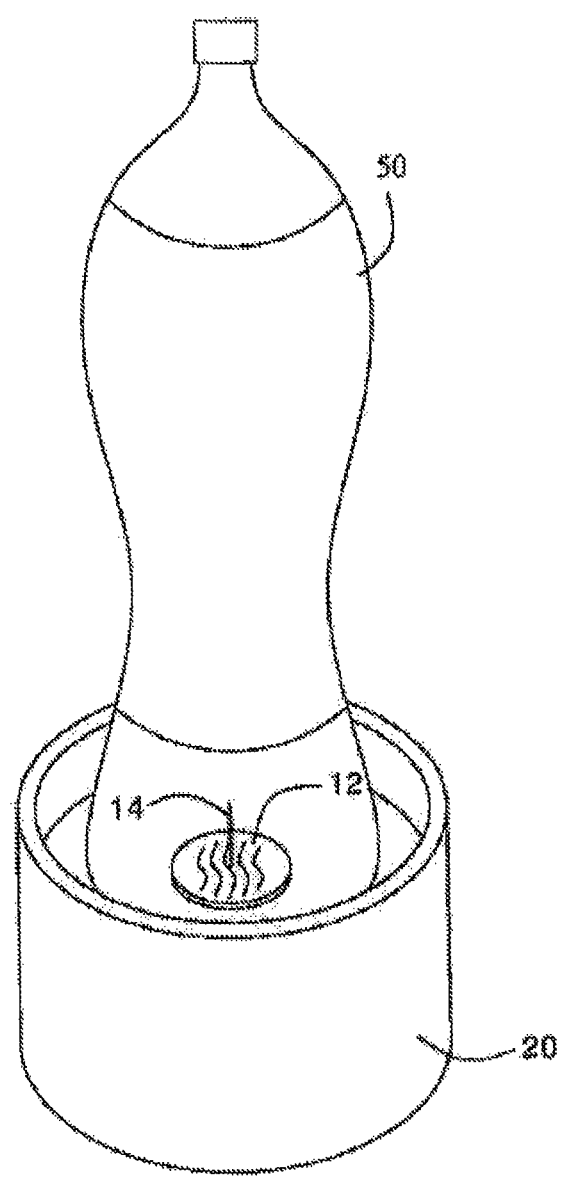
FIG. 2 schematically illustrates, according to an exemplary embodiment, a first step of using the gas filling apparatus of FIG. 1.

FIG. 2 schematically illustrates, according to an exemplary embodiment, a first step of using the gas filling apparatus of FIG. 1.

At the first step, the user pierces the bottom 52 of bottle 50 by piped tip 14 of gas filling apparatus 10.

Figure 3:
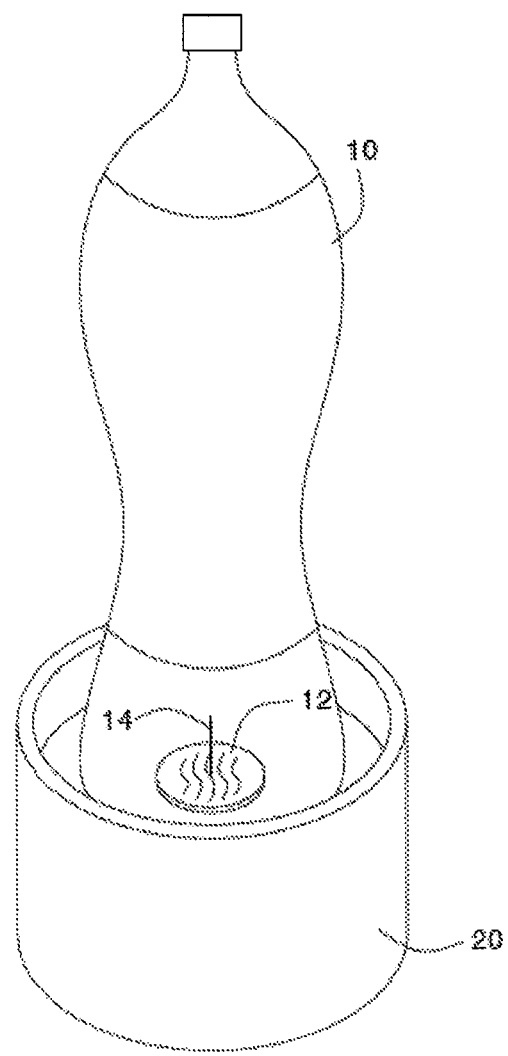
FIG. 3 schematically illustrates, according to an exemplary embodiment, a second step of using the gas filling apparatus of FIG. 1.

FIG. 3 schematically illustrates, according to an exemplary embodiment, a second step of using the gas filling apparatus of FIG. 1.

At the second step, the user releases carbon dioxide 22 from tank 18 (of FIG. 1), through piped tip 14, into bottom 52 of bottle 50.

Carbon dioxide 22 does not sink, but rather mixes within the beverage 54 and floats thereabove.

Figure 4:
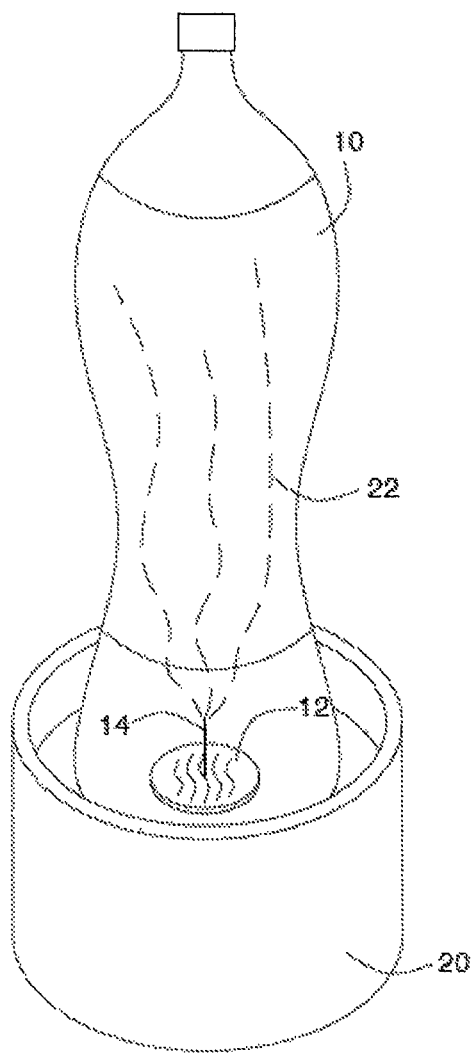
FIG. 4 schematically illustrates, according to an exemplary embodiment, a mechanism of releasing the carbon dioxide of FIG. 3.

FIG. 4 schematically illustrates, according to an exemplary embodiment, a mechanism of releasing the carbon dioxide of FIG. 3.

According to one embodiment, the releasing of the carbon dioxide is applied by pressing bottle 50 downwards, for bending the top surface 64 of chassis 20, for pressing on valve 22.

Figure 5:
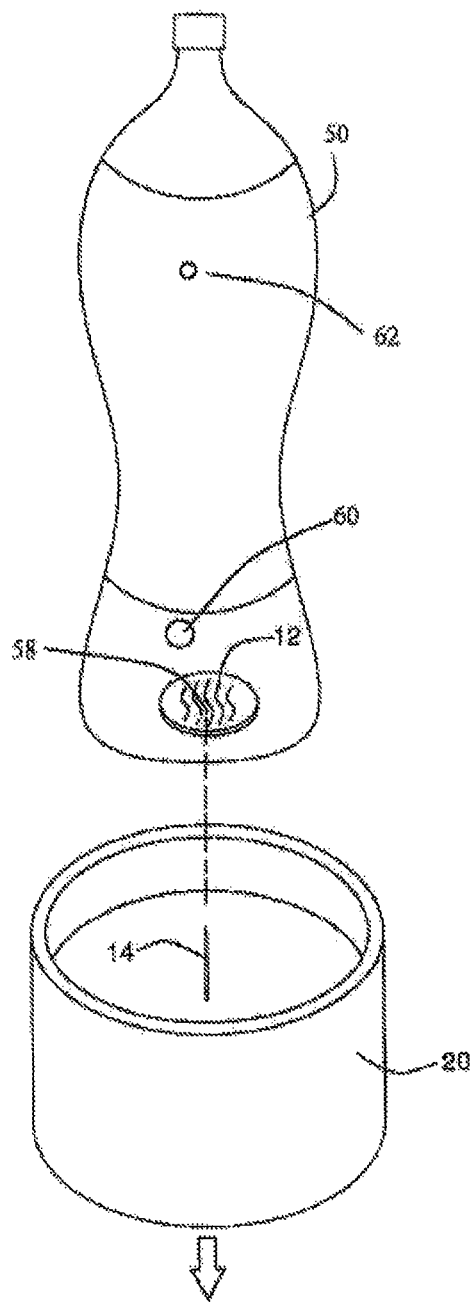
FIG. 5 schematically illustrates, according to an exemplary embodiment, a third step of using the gas filling apparatus of FIG. 1.

FIG. 5 schematically illustrates, according to an exemplary embodiment, a third step of using the gas filling apparatus of FIG. 1.

At the third step, the user removes bottle 50 from piped tip 14.

Since carbon dioxide 22 has not sunken, but has rather been mixed within the beverage 54 and floats thereabove, the pinhole 58, produced by piped tip 14 must be smaller than particles 60 of beverage 54, but may be larger that particles 62 of carbon dioxide 22.

Figure 6:
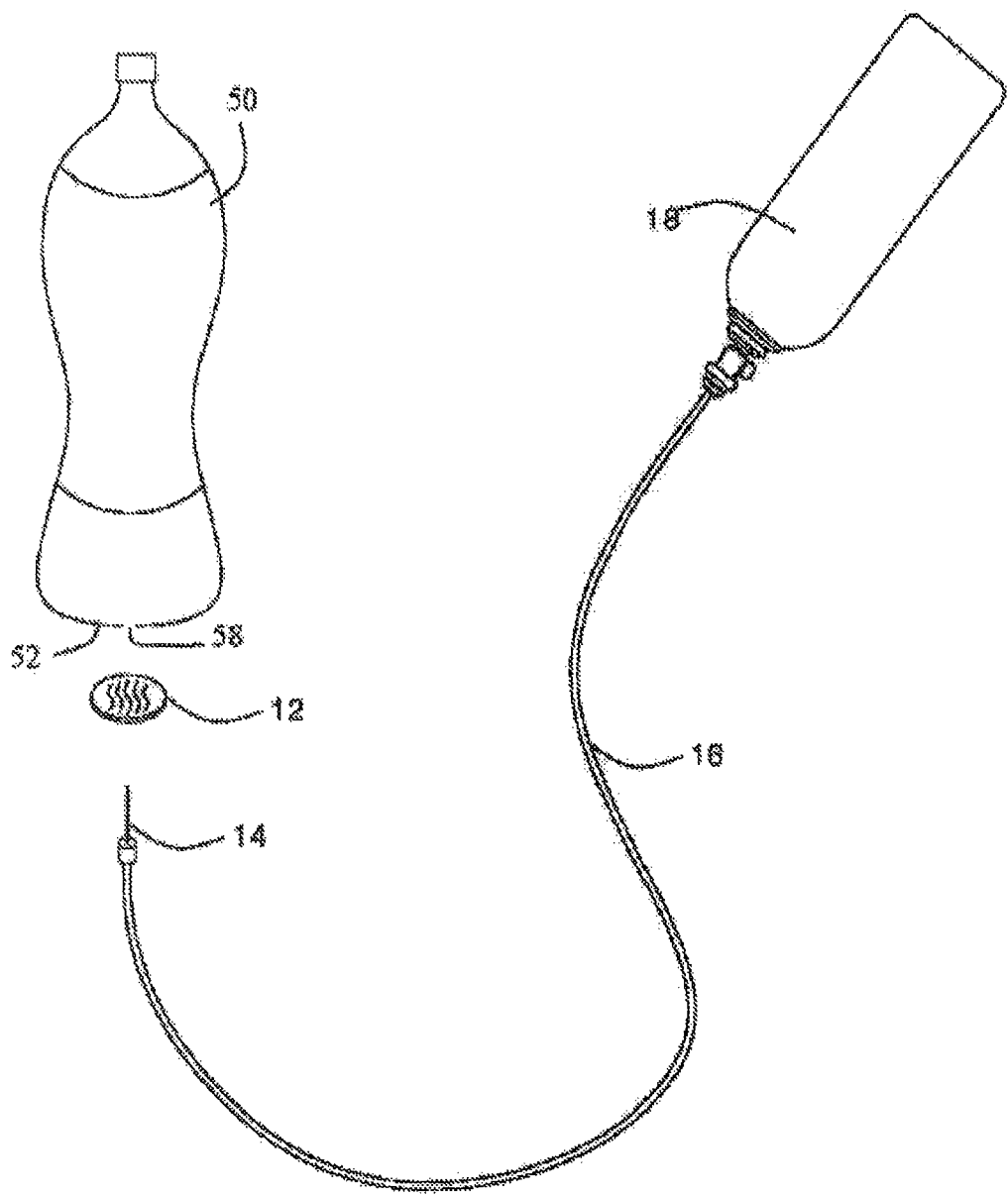
FIG. 6 schematically illustrates, according to an exemplary embodiment, a closure to the pinhole at the bottom of the bottle.

FIG. 6 schematically illustrates, according to an exemplary embodiment, a closure to the pinhole at the bottom of the bottle.

According to one embodiment, a sealing sticker 12, which may be made of rubber or latex, may be attached to bottom 52 of bottle 50. At the first above-mentioned step, sealing sticker 12 is pierced by piped tip 14. At the third above-mentioned step, sticker 12 covers pinhole 58.

Figure 7:
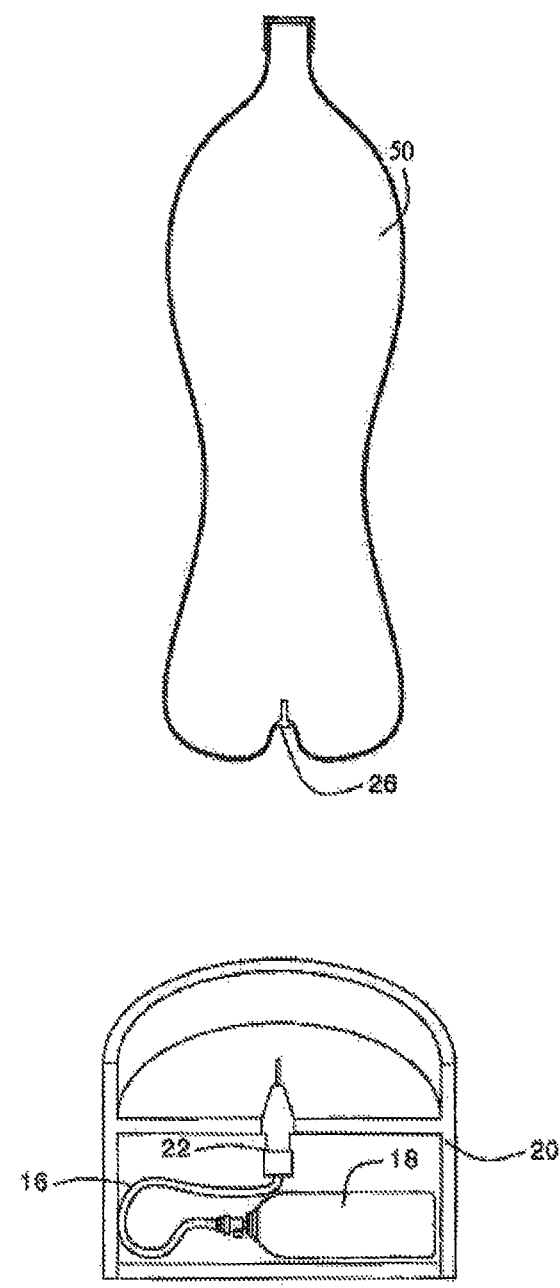
FIG. 7 schematically illustrates, according to an exemplary embodiment, a closure to the pinhole at the bottom of the bottle.

FIG. 7 schematically illustrates, according to an exemplary embodiment, a closure to the pinhole at the bottom of the bottle.

According to another embodiment, bottle 50 includes a valve 26. At the first above-mentioned step, piped tip 14 opens valve 26. At the third above-mentioned step, valve 26 closes.

Thus, the invention is directed to a gas filling apparatus (10), including:
 a high pressure tank 18, for supplying gas 22;
 a narrow piped tip (14), being piped to the high pressure tank (18), for administering the gas (22) through a bottom (52) of a beverage bottle 50,
 thereby since the administered gas 22 ascends away from the bottle bottom 52, the bottle bottom 52 requires liquid-quality-sealing 12 only.

The narrow piped tip (14) is sufficiently narrow for piercing the bottle bottom (52).

The liquid-quality-sealing (12) may comprise a sticker, for sticking thereof to the bottle bottom (52).

The gas filling apparatus (10) may further include:
a chassis (20), for disposing the narrow piped tip (14) erected, for allowing disposing the bottle (50) thereon.

The liquid-quality-sealing (12) may constitute a valve (26).

In FIGS. 1-7 and/or description above, the following reference numerals (Reference Signs List) have been mentioned:
numeral 10 denotes the gas filling apparatus according to one embodiment of the invention;
numeral 12 denotes a sealing sticker, being a sealing qualified to seal beverage, and is not qualified to seal pressurized gas;
numeral 14 denotes a pipe tip, being a short pipe ending with a tip;
numeral 16 denotes a pipe, for communicating the piped tip with the high pressure gas tank;
numeral 18 denotes a high pressure gas tank;
numeral 20 denotes a package or chassis, for packaging the elements, and for supporting the bottle;
numeral 22 denotes a press valve or a valve having a different mechanism;
numeral 26 denotes a valve disposed at the bottom of the bottle;
numeral 50 denotes a bottle being administered with gas, such as carbon dioxide;
numeral 52 denotes the bottom of the bottle;
numeral 54 denotes the beverage contained in the bottle;
numeral 58 denotes a pinhole. induced by the piercing of the bottom of the bottle;
numeral 60 denotes the beverage particle/drop, being large, in relation to a gas particle;
numeral 62 denotes the gas particle, being small, In relation to the beverage particle;
numeral 64 denotes the surface which supports the bottle.

The present subject matter further provides a system for allowing flow of gas into a liquid, contained in a cup-size container.

According to one embodiment, the system is configured to allow flow of gas into a liquid. According to a preferred embodiment, the system is configured to carbonate a liquid, namely allowing flow of carbon dioxide into the liquid.

According to another embodiment, the liquid is water. According to yet another embodiment, the liquid is an aqueous solution. According to still another embodiment, the liquid is an aqueous solution comprising sugar. According to a further embodiment, the solution is a beverage, for example juice, water containing a juice concentrate, a carbonated soft drink that it is desired to further carbonate it, and the like.

Figure 8:
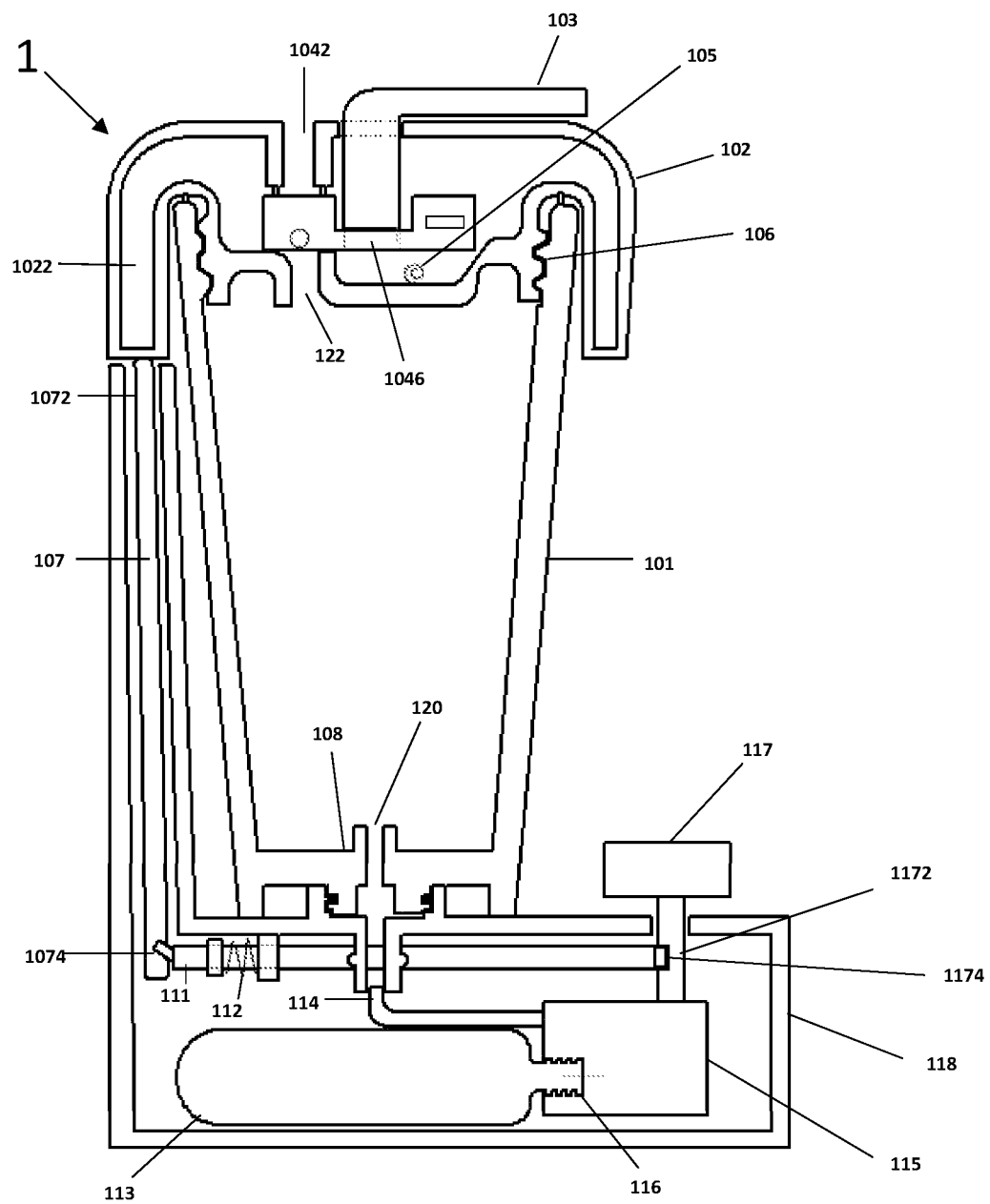
FIG. 8 schematically illustrates, according to an exemplary embodiment, a cross-section view of a system for allowing flow of gas into a liquid, contained in a container.

FIG. 8 schematically illustrates, according to an exemplary embodiment, a cross-section view of a system 1 for allowing flow of gas into a liquid, contained in a container. The system comprises: a container 101, a lid 102 configured to cover the container 101, a gas providing mechanism configured to provide gas into a liquid contained in the container 101, and a locking mechanism configured to ensure providing of gas into the liquid only when the container 101 is properly covered by the lid 102.

According to a preferred embodiment, the gas is carbon dioxide. According to another preferred embodiment, the liquid is a beverage. According to yet another embodiment, the container 101 is a cup.

The container 101 and the lid 102 comprise a screw thread 106 configured to allow proper covering of the container 101 by screwing the lid 102 over an opening of the container 101. The container 101 further comprises at the bottom a gas inlet 120 that will be described in detail hereinafter.

The lid 102 further comprises an orifice 122 configured to allow flow of excess gas from the cup 101. In addition, the lid 102 comprises a first plug 1042 connected to a second plug 1044 with a connector 1046, that are positioned in a space inside lid 102. A plug handle 103 is connected to the connector 1046 and protrudes from the top of the lid 102. Turning of the plug handle causes turning of the first plug 1042 and the second plug 1044 about a pivot positioned at the connector 1046 and the plug handle 103. At default the first plug 1042 blocks the orifice 122. When the plug handle 103 is turned, the second plug 1044 blocks the orifice 122. An elastic element 105, like a spring, ensures that a default state is that the first plug 1042 blocks the orifice 122. The first plug 1042 configured to block the orifice 122 as long as the gas pressure in the container 102 is under a predetermined threshold level. When the gas pressure inside the container 102 exceeds the threshold level, the first plug 1042 allows release of excess gas from the container 102 through the orifice 122. The orifice 122 is blocked by the first plug 1042 when gas is provide into a liquid contained in the container 101, thus eliminating building of a too high gas pressure in the container 101. The second plug 1044 is configured to release excess gas from the container 101 in order to allow removal of the lid 102 after gas is provided to the liquid contained in the container 101. Therefore, after gas is provided to the liquid, a user turns the plug handle 103, thus bringing the second plug 1044 to block the orifice 122. Excess gas is released and the lid 101 can be removed. When the plug handle 103 is released, the plugs return to the default state, namely the first plug 1042 blocks the orifice. Another embodiment of the second plug 1044 is that it is configured to prevent exit of foam from the container during the release of excess gas pressure. When a liquid, like a beverage that may contain sugar and other solutes, is gassed, for example carbonated, foam is produced. The second plug 1044 is configured to prevent flow of foam through it, and contamination of the system's components with foam. The second plug 1044, then, allows for example carbonation of beverages, while with prior art soda makers this is impossible and even prohibited, due to the formation of foam during carbonation that may contaminate the soda maker and for example block gas pipes of the soda maker.

The system 1 further comprises a base 118 configured to accommodate the gas providing mechanism and connect the container 101 to the gas providing mechanism. The base 118 encloses a space where at least one gas source 113 may be accommodated. The gas source 113 may be for example a gas balloon containing 12 gr pressurized carbon dioxide. Each gas source 113 comprises near its opening a connecting mechanism, for example a screw thread 116, configured to connect to a gas container 115. According to one embodiment, the gas container 115 is a chamber to which all the gas sources 113 are fluidically connected. According to another embodiment, the gas container 115 is a gas pipe connected to each gas source 113, while all the gas pipes are united to a common gas pipe 114. The common gas pipe 114 is fluidically connected to a gas entry mechanism that is configured to allow entry of the gas into the container 102 through the gas inlet 120, and will be described in detail hereinafter.

The system 1 further comprises an operation button 117 positioned at the top of the base 118 and connected to the gas entry mechanism. Pressing the operation button 117 downwards actuates the gas entry mechanism and allows flow of gas from the container 115 and common gas pipe 114 into the container 101 through the gas inlet 120 of the container 101.

The base 118 further comprises a container screw thread 109 and the container 101 comprises a corresponding screw thread 109 at the bottom of the container 101 around the gas inlet 120. The container screw threads 109 are configured to connect the container 101 to the base 118 while allowing the gas inlet 120 of the container to be fluidically connected with the gas entry mechanism.

The system 1 further comprises a locking mechanism configured to prevent entry of gas into the container 101 when the lid 102 does not cover the container 101 properly. The locking mechanism comprises a vertical shaft 107 that is positioned vertically while its upper end 1072 is configured to be in contact with a rim 1022 of the lid 102, and at the lower end of the vertical shaft 107 there is a recess 1074. The locking mechanism further comprises a horizontal shaft 111. A first end of the horizontal shaft 111 is configured to be accommodated by the recess 1074 of the vertical shaft 107. A second end of the vertical shaft 111 is configured to be accommodated by a recess 1174 at a bar 1172 vertically connected to a lower part of the operation button 117. The vertical shaft 111 is connected to an elastic member 112, for example a spring. When the container 101 is not covered by the lid 102, the vertical shaft 107 protrudes upwards, the first end of the horizontal shaft 111 is outside the recess 1074 of the vertical shaft 107, and the second end of the vertical shaft 111 is inside the recess 1174 of the operation bar 117. At this situation, the operation bar 117 cannot be pressed downwards, because the second end of the vertical shaft 111 that it inserted into the recess 1174 of the operating button 117, prevents movement of the operation button 117 downwards. As a result gas is not entered into the container 101. Also when the lid 102 is positioned on the container 101, but does not close the container 101 properly, the rim 1022 of the lid 102 does not press the vertical shaft 107 downwards, and pressing of the operation button 117 downwards is eliminated as described above. However, when the lid 102 properly covers the container 101, the rim 1022 of the lid 102 presses the vertical shaft 107 downwards. As a result the first end of the horizontal shaft 111 is inserted into the recess 1074 of the vertical shaft 107, due to the action of the elastic member 112. As a result, the second end of the horizontal shaft 111 exits the recess 1174 of the operating button 117, and now the operating button 117 is free to move downwards when pressed by a user and allow entry of gas into the container 101.

Figure 9:
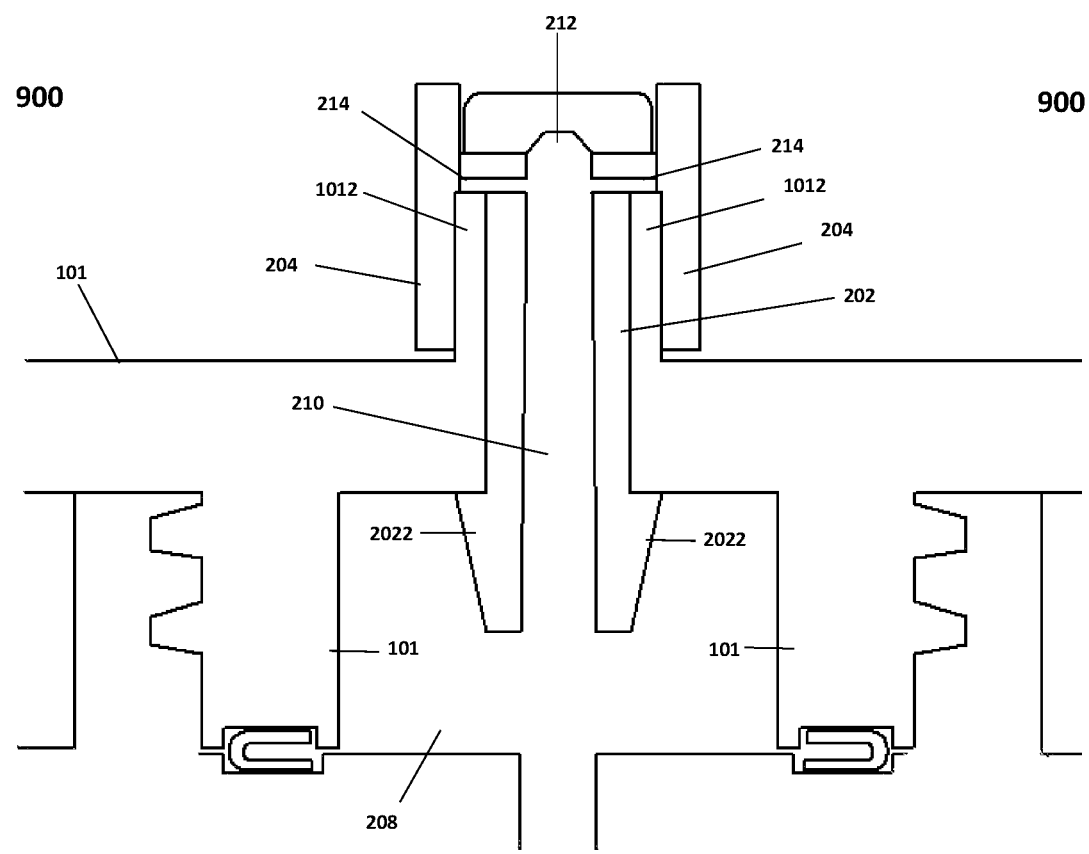
FIG. 9 schematically illustrates, according to an exemplary embodiment, a cross-section view of a gas entry system.

FIG. 9 schematically illustrates, according to an exemplary embodiment, a cross-section view of a gas entry system. The gas entry system is positioned at the bottom of the container 101, and the parts that are designated in FIG. 9 with 101 are parts of to bottom of the container 101. The container 101 is attached to the base 118 (see FIG. 8) through the screw threads 109 described above. Gas, for example carbon dioxide, flows towards the container 101 through gas pipe 206 that is fluidically connected to common gas pipe 114 that is illustrated in FIG. 8. From gas pipe 206 the gas enters gas chamber 208 and continues into gas pipe 210 which is blocked at its edge 212. The only way the gas may flow further is into space 214 that is blocked with an elastic block 204. The elastic block 204 is made of an elastic material that is approved by regulatory authorities for being in contact with foods and beverages, for example but not limited to, an FDA approved food grade rubber. The default state of the elastic block is to stick to the vertical part of the container designated 1012. However, when a gas pressure is built in space 214, it pushed aside the elastic block 204 and enters into a liquid 900 contained in the container 101. When the gas pressure in space 214 gets down, the elastic block 204 returns to its default state, namely sticking to the vertical parts 1012 of the container 101, thus preventing leakage of liquid 900 from the container 101. The gas entry system, comprising the elastic block, space 214, and gas pipe 210 including its blocked edge 212, further comprises a snagging pin 202 that is inserted into the bottom gas inlet 120 of the container 101, illustrated in FIG. 8, and attaches to the bottom of the container 101 with flexible attachment element 2022.

Figure 10:
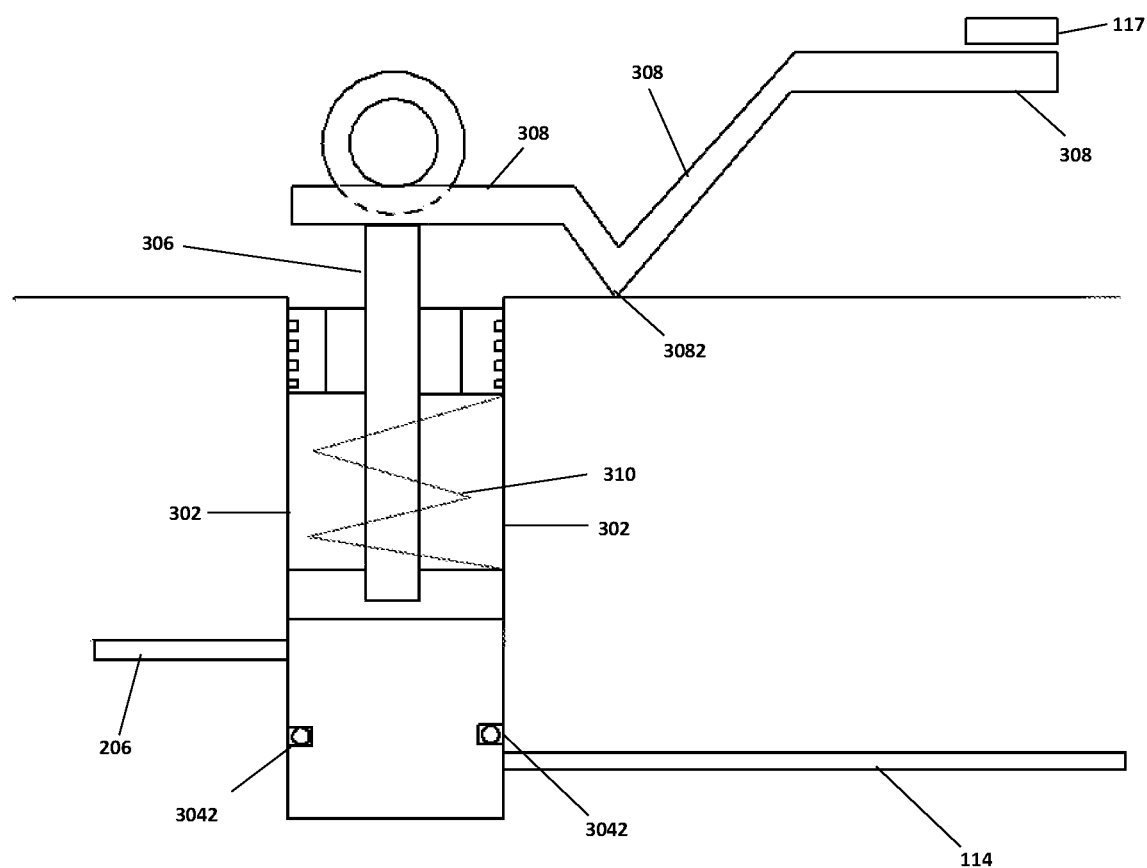
FIG. 10 schematically illustrates, according to an exemplary embodiment, a cross-section view of a mechanism that actuates flow of gas by pressing down an operation button.

FIG. 10 schematically illustrates, according to an exemplary embodiment, a cross-section view of a mechanism that actuates flow of gas by pressing down an operation button 117. Gas pipe 206 that transfers gas into the gas entry system illustrated in FIG. 9, exits a cylinder 302 from one side. Common gas pipe 114 transfers gas from gas container 115 (see FIG. 8) into the cylinder 302. In the cylinder there is a piston 304 configured to move inside the cylinder 302. The piston comprises an O-ring 3042 configured to prevent leakage of gas through the gap between the piston 304 and the cylinder 302. The piston 304 is connected to a pin 306 that is connected to one side of a lever 308 having a pivotal point 3082. Another side of the lever 308 is attached to the operating button 117. When the piston 304 is inside the cylinder 302, the common gas pipe 114 and gas pipe 206 are fluidically disconnected, and no gas flows into gas pipe 206 and from there into the container 101. When operating button 117 is pressed down, the lever 308 raises up the pin 306 and with it the piston 304. When the piston 304 is above the connection point of common gas pipe 114 and gas pipe 206, gas flows from common gas pipe 114 into the cylinder 302 and from there into gas pipe 206. In addition, an elastic member 310, for example a spring is attached to an edge of the piston 304, and the default state of elastic member 310 is to push the piston 304 back into the cylinder 302. Thus, when the pressure exerted on the operating button 117 is released, the piston 304 returns into the cylinder 302 and blocks again flow of gas from common gas pipe 114 into the cylinder 302 and from there further into gas pipe 206.

Figure 11:
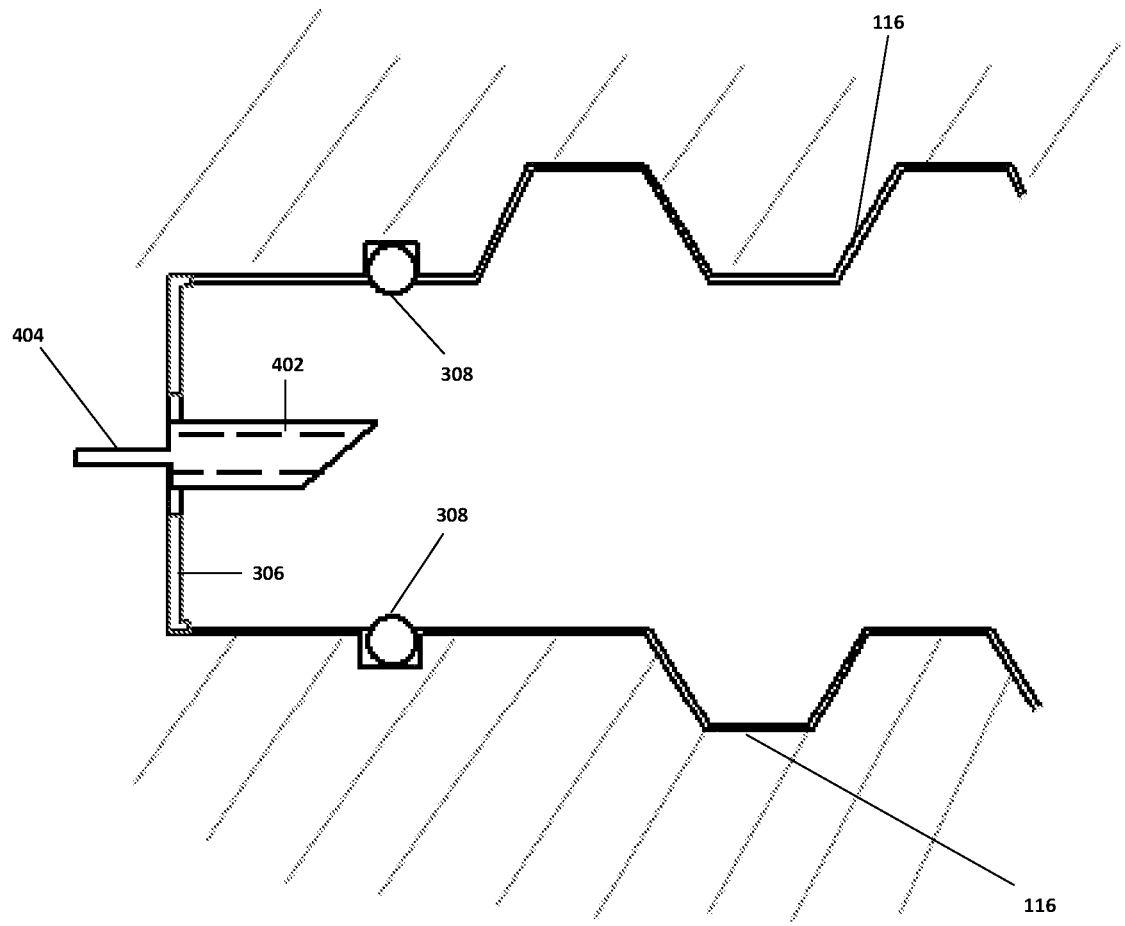
FIG. 11 schematically illustrates, according to an exemplary embodiment, a cross-section view of a connecting mechanism configured to connect a gas source to a gas container, illustrated in FIG. 8, with a screw thread.

FIG. 11 schematically illustrates, according to an exemplary embodiment, a cross-section view of a connecting mechanism configured to connect a gas source 113 to a gas container 115, illustrated in FIG. 8, with a screw thread 116. Screw thread 116 is configured to engage with a corresponding screw thread of a gas source 113. The connection mechanism further comprises a striker 402 fluidically connected with a gas pipe 404. The striker 402 is configured engage with a plug on an opening of the gas source 113, and opening it, thus allowing flow of gas from the gas container 103 into gas pipe 404, and from there either to gas container 115 or into common gas pipe 114, as described above in detail. The connecting mechanism may optionally comprise a seal 306 that is configured to prevent leakage of gas when the gas source 113 is connected to screw thread 116. The connecting mechanism may further comprise an O-ring 308 that is also configured to prevent leakage of gas when the gas source 113 is connected to screw thread 116.

It is appreciated that certain features of the subject matter, which are, for clarity, described in the context of separate embodiments, may also be provided in combination in a single embodiment. Conversely, various features of the subject matter, which are, for brevity, described in the context of a single embodiment, may also be provided separately or in any suitable sub combination.

Although the subject matter has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A system for allowing gas to flow into a liquid, the system comprising:
   a container having a bottom wherein the bottom comprises a gas inlet;
   a lid configured to cover the container;
   a gas providing mechanism configured to allow flow of the gas through the gas inlet into the liquid when contained in the container; and
   a locking mechanism configured to ensure flow of gas into the liquid only when the container is properly covered by the lid.

2. The system of claim 1, wherein the gas is carbon dioxide.

3. The system of claim 1, wherein the liquid is water.

4. The system of claim 1, wherein the liquid is a beverage.

5. The system of claim 1, wherein the container is in a size of a cup.

6. The system of claim 1, wherein the container and the lid comprise a screw thread configured to allow proper covering of the container by screwing the lid over an opening of the container.

7. The system of claim 1, wherein the locking mechanism comprises:
   a vertical shaft comprising an upper end configured to be in contact with a rim of the lid, and a lower end comprising a recess; and
   a horizontal shaft comprising a first end configured to be accommodated by the recess of the vertical shaft, and a second end configured to be accommodated by a recess at a bar vertically connected to a lower part of an operation button,
   wherein the vertical shaft is connected to an elastic member.

8. The system of claim 1, wherein the lid further comprises an orifice configured to allow flow of excess gas from the container when pressure of the gas within the container exceeds a threshold level.

9. The system of claim 8, wherein the lid further comprises:
   a first plug connected to a second plug with a connector, wherein said first plug, said second plug, and said connector are positioned in a space inside the lid, and a plug handle is connected to the connector and protrudes from the top of the lid,
   wherein the first plug is configured to block the orifice as long as the gas pressure in the container is under a predetermined threshold level,
   wherein the second plug is configured to release excess gas from the container in order to allow removal of the lid after gas is allowed to flow into the liquid contained in the container,
   wherein turning of the plug handle causes turning of the first plug and the second plug about a pivot positioned at the connector and the plug handle, and
   wherein at default, the first plug blocks the orifice, and when the plug handle is turned, the second plug blocks the orifice.

10. The system of claim 9, wherein the second plug is configured to prevent exit of foam from the container during the release of excess gas pressure.

* * * * *